United States Patent [19]

Artykov et al.

[11] Patent Number: 4,820,799

[45] Date of Patent: Apr. 11, 1989

[54] PROCESS FOR PRODUCING WATER-SOLUBLE POLYELECTROLYTE

[75] Inventors: Farykhdzhon A. Artykov, Tashkent; Ljudmila A. Lilbok; Jury P. Novikov, both of Navoi; Karim S. Akhmedov, Tashkent; Aziz S. Zainutdinov, Tashkent; Sadriddin Zainutdinov, Tashkent, all of U.S.S.R.

[73] Assignee: Institut Khimi Akademii Nauk Uzbekskoi SSR, Tashkent, U.S.S.R.

[21] Appl. No.: 143,450

[22] Filed: Jan. 12, 1988

[51] Int. Cl.$^4$ .................. C08F 3/44; C08G 63/44
[52] U.S. Cl. ..................... 528/363; 106/900; 528/271
[58] Field of Search ................. 528/363, 271

[56] References Cited

U.S. PATENT DOCUMENTS 4,209,598 6/1980 Patzschke ................. 528/363

FOREIGN PATENT DOCUMENTS 475370 of 0000 U.S.S.R. .

OTHER PUBLICATIONS

Article "On Production of New Polymeric Preparations . . . ", Pogorel'sky.

*Primary Examiner*—Harold D. Anderson
*Assistant Examiner*—T. Mason
*Attorney, Agent, or Firm*—Ladas & Parry

[57] ABSTRACT

A process for producing a water-soluble polyelectrolyte comprising mixing acrylic acid or methacrylic acid with ammonium carbonate and a polyhydric alcohol—glycerol or ethylene glycol at a molar ratio therebetween of 2–6:1–2:1 respectively; adding hydrogen peroxide to the resulting reaction mass in an amount of from 0.1 to 1.0% by mass of the acid; polymerization of the reaction mass first at a temperature of 60° to 80° C. then at a spontaneous elevation of temperature to 110°–140° C.

1 Claim, No Drawings

PROCESS FOR PRODUCING WATER-SOLUBLE POLYELECTROLYTE

FIELD OF THE INVENTION

The present invention relates to polymer chemistry and, more specifically, to processes for producing water-soluble polyelectrolytes. These water-soluble polyelectrolytes are useful as flocculants in clarification and thickening of various dispersed systems, for example in hydrometallurgy for concentration of ore pulps, for clarification and purification of industrial effluents or natural waters, for intensification of processes of filtration of china-clay suspensions. Furthermore, water-soluble polyelectrolytes can be useful as a soil conditioner (in the provision of artificial soil structures).

BACKGROUND OF THE INVENTION

Known in the art is a process for producing a water-soluble polyelectrolyte by way of passing gaseous ammonia through acrylic acid, followed by polymerization of the resulting reaction mass in the presence of a polymerization initiator—hydrogen peroxide (cf. Uzbekesky Khimichesky Zhurnal /Uzbek Chemical Journal/, No. 2, 1962, Uzbek SSR Academy of Sciences Publishing House, Tashkent; K.S.Akhmedov. K.V.Pogorelsky "Production of novel polymeric preparations for artificial structurization of soils and other disperse systems", pp. 43–45).

The polyelectrolyte produced by this prior art process features an unsatisfactory solubility in water, as well as a low flocculating and structurizing capacity.

Also known in the art is a process for producing a water-soluble polyelectrolyte comprising mixing acrylic acid with ammonium carbonate at the molar ratio of acrylic acid to ammonium carbonate of 2:1 respectively, followed by the addition of hydrogen peroxide to the resulting reaction mass in an amount of from 0.5 to 0.9% by mass of acrylic acid at a temperature of 7820 –80° C. for 20 minutes and then—at a spontaneous elevation of temperature to 110°–140° C. (SU, A, 475370).

This prior art process has a disadvantage residing in that polymerization of the reaction mass at the temperature of 78°–80° C. is effected for a relatively long time (20 minutes) which is associated with high level of energy consumption.

Furthermore, the water-soluble polyelectrolyte produced by this process has a relatively low flocculating capacity and a relatively low structurization capacity in the formation of an artificial soil structure. Thus, in thickening of ore pulps at a mass ratio of the solid phase (S) to the liquid phase—water (L) equal to 1:4–5 respectively and at the consumption rate of the flocculant (the above-mentioned polyelectrolyte) of 50 g per 1 ton of the ore pulp the coefficient efficient of the flocculatng ability is 0.87. In the formation of an artificial structure such as sierozem (gray desert soil) /plough depth 0–25 cm/ the structurization capacity of the polyelectrolyte (i.e. its capacity of forming water-resistant soil aggregates with a diameter above 0.25 mm) is 59.9% at the concentration of polyelectrolyte in sierozem of 0.03% by mass.

SUMMARY OF THE INVENTION

It is an object of the present invention to provide such a process for producing a water-soluble polyelectrolyte which would make it possible to lower power consumption for carrying out the process of polymerization.

It is another object of the present invention to provide such a process which would make it possible to obtain a water-soluble polyelectrolyte with improved flocculating and structuring capacity.

These and other objects of the present invention are accomplished by the provision of a process for producing a water-soluble polyelectrolyte comprising mixing acrylic or methacrylic acid with ammonium carbonate at a molar ratio of the acid to ammonium carbonate of 2–6:1–2 respectively, followed by the addition of hydrogen peroxide in an amount of from 0.1 to 1.0% by mass of the acid and polymerization first at a temperature of from 60° to 80° C. and then—at a spontaneous elevation of temperature to 110°–140° C.; in accordance with the present invention, into the mixing stage glycerol or ethylene glycol is introduced in a molar ratio of acrylic or methacrylic acid equal to 1:2–6 respectively and polymerization at a temperature of from 60° to 80° C. is conducted for a period of from 3 to 6 minutes.

Glycerol or ethylene glycol employed in the process according to the present invention takes part in the polymerization process as a comonomer which ensures preparation of a water-soluble polyelectrolyte with different hydrophilic functional groups: carboxy, carboxylate, amido, ester and hydroxy groups which in combination impart improved flocculant and structuring properties to the polyelectrolyte. Thus, in thickening of ore pulps at a mass ratio of the solid phase (S) to the liquid phase (water) (L) equal to 1:4–5 respectively and at the rate of consumption of said polyelectrolyte (flocculant) of 50 g per ton of the ore pulp the coefficient of flocculating capacity is 0.94. For example, in purification of effluents from electroplating processes with the pH of 9.18 containing: suspended substances—193 mg/l, $Fe^{3+}$—20.5 mg/l, $Zn^{2+}$—5.08 mg/l, $Cu^{2+}$—1.16 mg/l with the use of 6 mg/l of a water-soluble polyelectrolyte produced by the process according to the present invention using methacrylic acid, ammonium carbonate and glycerol and denoted by the symbol MG, the following results were obtained (after a 10-minutes' settling of the effluents) which are presented in the Table hereinbelow. For the purpose of comparison the same Table shows the results obtained after a reagentless (without treatment with polyelectrolyte) settling of waste waters for the period of 10 minutes (control).

TABLE

| Water-soluble polyelectrolyte (flocculant) | Residual content of suspended matter in purified effluents, mg/l | Residual content of ions of metals in purified waste waters, mg/l | | |
|---|---|---|---|---|
| | | $Fe^{3+}$ | $Cu^{2+}$ | $Zn^{2+}$ |
| MG | 18 | 2.43 | 0.51 | 0.90 |
| Control | 76 | 5.90 | 0.83 | 2.57 |

As it is seen from the above Table, the water-soluble polyelectrolyte produced by the process according to the present invention manifests itself as an effective flocculant in purification of metal-containing waste waters.

In the formation of an artificial structure such as sierozem (plough depth 0–25 cm) the structuring capacity (i.e. the ability of forming water-resistant soil aggregates of a diameter above 0.25 mm) of the water-soluble polyelectrolyte produced by the process according to the present invention is 63-65% at a concentration of the polyelectrolyte in sierozem of 0.03% by mass.

The use of glycerol or ethylene glycol as a comonomer makes it possible to accelerate the polymerization process, namely to shirten the polymerization duration at a temperature of from 60° to 80° C. to 3-6 minutes and, hence, to reduce power consumption for carrying out the polymerization process.

As it has been already mentioned hereinbefore, in the process according to the present invention acrylic or methacrylic acid is mixed with ammonium carbonate, as well as with glycerol or ethylene glycol in a molar ratio of 2-6:1-2:1 respectively. It is inadvisable to use acrylic or methacrylic acid, ammonium carbonate and glycerol or ethylene glycol at a molar ratio thereof less than 2:1:1, since the process of polymerization is decelerated. It is neither advisable to use acrylic or methacrylic acid, ammonium carbonate, glycerol or ethylene glycol at a molar ratio thereof above 6:2:1, since in this case polymerization occurs with the formation of homopolymers of acrylic or methacrylic acid.

In the process according to the present invention hydrogen peroxide is used in an amount of from 0.1 to 1.0% by mass of acrylic or methacrylic acid. It is undesirable to use hydrogen peroxide in an amount of below 0.1% by mass of the acid since the process of polymerization in this case does not proceed at all. It is inadvisable to use hydrogen peroxide in an amount of above 1.0% by mass of the acid, since the resulting water-soluble polyelectrolyte has an insufficient molecular mass.

As it has been already mentioned hereinbefore, the process of polymerization is carried out at a temperature within the range of from 60° to 80° C. for 3 to 6 minutes. It is inadvisable to conduct the process at a temperature below 60° C., since polymerization is decelerated. It is also inexpedient to carry out polymerization at a temperature above 80° C., since the resulting water-soluble polyelectrolyte has an insufficient molecular mass. It is undesirable to carry out polymerization at a temperature within the above-specified range for a period of less than 3 minutes, since the polymerization process is not completed. The polymerization duration of more than 6 minutes is neither advisable, since the process further proceeds with evolution of heat and elevation of temperature to 110°-140° C. which excludes the necessity of heating the reaction mass.

DETAILED DESCRIPTION OF THE INVENTION

The process for producing a water-soluble polyelectrolyte is effected in the following manner.

Into a vessel provided with a thermometer and a stirrer charged are acrylic or methacrylic acid, ammonium carbonate and a polyhydric alcohol—glycerol or ethylene glycol in a predetermined ratio (molar ratio of the acid to ammonium carbonate and the alcohol is equal to 2-6:1-2:1 respectively) and stirring is effected. Then the resulting reaction mass is added with hydrogen peroxide in an amount of from 0.1 to 1.0% by mass of acrylic or methacrylic acid.

Then the reaction mass is heated to a temperature of from 60° to 80° C. and polymerization is conducted for 3 to 6 minutes. On expiration of this time a spontaneous elevation of temperature of the reaction mass to 110°-140° C. for 5-10 minutes is observed. During polymerization there occurs interaction of acrylic or methacrylic acid, ammonium carbonate and the polyhydric alcohol at carboxy and hydroxy groups which is accompanied by an intensive liberation of vapours of water and carbon dioxide.

On completion of the polymerization reaction which is established by the end of evolution of water vapours a water-soluble polyelectrolyte is obtained in the form of a porous mass which after congelation is readily disintegrated into a powder. The thus-produced polyelectrolyte is well-soluble in water, forms viscous stable solutions. This polyelectrolyte is transportable and stable in a long-time storage.

For a better understanding of the present invention some specific examples illustrating its embodiments are given hereinbelow.

EXAMPLE 1

Into a vessel provided with a thermometer and a stirrer acrylic acid, ammonium carbonate and glycerol are charged at the molar ratio of 3:1:1 respectively and stirring of the components is effected. Then the resulting reaction mass is added with a 33% hydrogen peroxide in the amount of 0.1% by mass of acrylic acid.

Then the formed reaction mass is heated to the temperature of 60° C. and polymerization is carried out at this temperature for 6 minutes. On expiration of this time a spontaneous elevation of temperature of the reaction mass to 110°-120° C. occurs for 7 minutes. The polymerization is accompanied by an intensive evolution of vapours of water and carbon dioxide.

On completion of the reaction of polymerization a water-soluble polyelectrolyte is obtained in the form of a porous mass which after solidification can be readily disintegrated into a powder.

EXAMPLE 2

A water-soluble polyelectrolyte is produced in a manner similar to that described in Example 1. In doing so, use is made of methacrylic acid, ammonium carbonate and ethylene glycol in the molar ratio of 2:1:1 respectively.

Hydrogen peroxide (33%) is used in the amount of 0.5% by mass of methacrylic acid.

Polymerization is conducted first at the temperature of 70° C. for 5 minutes and then—at a spontaneous elevation of temperature to 130°-140° C. for 5 minutes.

EXAMPLE 3

A water-soluble polyelectrolyte is produced as described in Example 1 hereinabove. Acrylic acid, ammonium carbonate and ethylene glycol are used in the molar ratio of 6:2:1 respectively.

Hydrogen peroxide (33%) is used in the amount of 0.7% by mass of acrylic acid.

Polymerization is carried out first at the temperature of 80° C. for 3 minutes and then at a spontaneous elevation of temperature to 120°-130° C. for 6 minutes.

EXAMPLE 4

A water-soluble polyelectrolyte is produced in a manner similar to that of Example 1. Methacrylic acid, ammonium carbonate and glycerol are used in the molar ratio of 4:2:1 respectively.

Hydrogen peroxide (33%) is used in the amount of 1.0% by mass of methacrylic acid.

Polymerization is conducted first at the temperature of 75° C. for 4 minutes and then - at a spontaneous elevation of temperature to 115°-125° C. for 10 minutes.

Therefore, the process of the present invention makes it possible to produce a water-soluble polyelectrolyte which is an effective flocculant useful in thickening of ore pulps, for intensification of filtration of china-clay suspensions, for clarification and cleaning of industrial effluents and natural waters, as well as an efficient soil conditioning agent.

What is claimed is:

1. A process for producing a water-soluble polyelectrolyte comprising mixing an acid selected from the group consisting of acrylic acid and methacrylic acid with ammonium carbonate and a polyhydric alcohol selected from the group consisting of glycerol and ethylene glycol at a molar ratio of the acid to ammonium carbonate and said polyhydric alcohol of 2–6:1–2:1 respectively; adding hydrogen peroxide to the resulting reaction mass in an amount of from 0.1 to 1.0% by mass of said acid; polymerization of said reaction mass first at a temperature ranging from 60° to 80° C. for 3 to 6 minutes, then at a spontaneous elevation of temperature to 110°–140° C.

* * * * *

UNITED STATES PATENT AND TRADEMARK OFFICE
CERTIFICATE OF CORRECTION

PATENT NO. : 4,820,799
DATED : APRIL 11, 1989
INVENTOR(S) : FARYKHDZHON A. ARTYKOV ET AL

It is certified that error appears in the above-identified patent and that said Letters Patent is hereby corrected as shown below:

Title page, Column 1, Paragraph [73]

Assignee "Khimi" should read -- Khimii --.

Signed and Sealed this

Twenty-third Day of October, 1990

Attest:

HARRY F. MANBECK, JR.

Attesting Officer

Commissioner of Patents and Trademarks